Nov. 29, 1960
W. BRODBECK
2,962,153
MACHINE TOOL HAVING ROTARY WORKPIECE
CARRIER OF THE TYPE WHICH
IS FULLY ROTATABLE
Filed Sept. 9, 1958
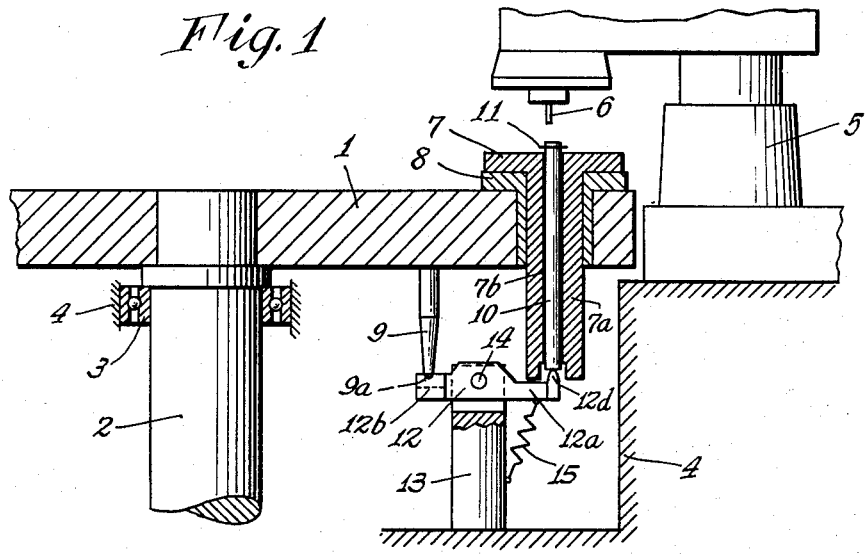
INVENTOR.
Willy Brodbeck
BY
Munn, Liddy, Daniels & March
ATTORNEYS United States Patent Office 2,962,153
Patented Nov. 29, 1960

2,962,153
MACHINE TOOL HAVING ROTARY WORKPIECE CARRIER OF THE TYPE WHICH IS FULLY ROTATABLE

Willy Brodbeck, Calmbach (Enz), Germany, assignor to Alfred Gauthier, G.m.b.H., Calmbach (Enz), Germany, a corporation of Germany Filed Sept. 9, 1958, Ser. No. 759,887
Claims priority, application Germany Sept. 14, 1957
2 Claims. (Cl. 198—209)

This invention relates to machine tools wherein a rotary workpiece carrier or dial is arranged for full rotation and provided with means for mounting a plurality of workpieces, said carrier being indexed or advanced periodically and then held at rest in different rotative positions corresponding in number to the number of workpiece mounting means which it carries.

One object of the invention is to provide a novel and improved machine tool of the above type, having novel automatic means for ejecting or discharging the finished workpieces from the rotary carrier or dial, said ejecting means being positive and extremely reliable in its operation, and being independent of the types and sizes of workpieces which are handled. Another object of the invention is to provide an improved machine tool and workpiece-ejecting means in accordance with the foregoing, which is extremely simple in its construction and adaptable to a wide variety of workpieces, thereby to increase the field of usefulness of the machine.

The above objects are accomplished, in accordance with the invention, by the provision on the said workpiece carrier of a movable ram or plunger associated with each of the workpiece holders, and by the further provision on the workpiece carrier of a plurality of actuator members, one associated with each workpiece holder, said plungers when actuated functioning to dislodge the workpieces from the holders or supports so as to initiate removal of the workpieces from the machine. There is further provided on the stationary frame or housing of the machine an actuating device engageable with the said plungers to operate the same and also engageable with the actuator members to be actuated thereby. The actuator device includes a spring-charged movable part involved in the said engagement with the actuator members, the entire action being effected by and being responsive to the movement of the workpiece carrier or dial as the latter advances the workpiece holders and the associated actuator members to the discharge station of the machine.

By such construction, in accordance with the invention, there is provided a machine tool of the above type wherein the ejecting or discharge of the finished workpieces is automatically and with no possibility of failure or malfunctioning. Moreover, the reliability of the discharge operation is had equally with various kinds and types of workpieces, especially those having relatively small dimensions and/or masses. In addition, the structure by which the above objects are accomplished, in accordance with the invention, requires only simple components, which may be economically fabricated. There is also the special advantage, with the present improved ejecting construction, that the discharge of the workpieces from the holders on the carrier is done during the advancing or indexing movement of the latter. By such organization the workpieces may be discharged upon leaving the last machining or work-performing station, and new workpieces may be placed in the holders at the immediately succeeding station. In consequence, the discharge of the workpieces does not require a given position of rest of the workpiece carrier, and therefore an optimum number of work-performing stations may be arranged at the machine.

The actuating device by which the discharge of the workpieces is effected may involve relatively few components of simple construction while at the same time retaining the highest degree of reliability of operation, by constituting such actuating device as a two-armed lever under the action of a biasing spring. One arm of such lever is arranged to engage and drive the movable rams or plungers of the workpiece holders, whereas the other lever arm is adapted for engagement by the actuator members mounted on the workpiece carrier or dial. The said other arm is provided with a camming face for engagement with the said actuator members, said face being disposed at an angle with respect to the plane of the workpiece carrier or dial whereby the members in advancing on the said arm will cam the latter and cause tilting of the two-armed lever.

An embodiment of the invention is illustrated in the figures.

Figure 1 is a schematic view, partly in vertical section and partly in side elevation, of a machine tool having a rotary, fully rotatable workpiece carrier, provided with a plurality of workpiece holders or supports. One such workpiece holder is illustrated in section, having associated with it an ejecting ram or plunger, as provided by the invention.

Fig. 2 is a fragmentary diagrammatic top view of the machine in broken outline, and of the actuating device carried by the machine frame or bed. The workpiece carrier and several workpiece holders are shown in broken outline.

Fig. 3 is an end elevational view of the two-armed lever constituting a portion of the actuating device shown in Figs. 1 and 2.

Referring first to Figs. 1 and 2, the workpiece carrier of the machine tool is indicated by the numeral 1. The carrier 1 may be advantageously constituted as a circular disk, carried by a shaft 2 mounted in an anti-friction bearing 3 which is supported by the machine frame or housing 4. As shown in Fig. 1, the machine housing or frame may be provided with a plurality of tool units 5, disposed about the workpiece carrier or dial 1, only one such unit however being illustrated for reasons of clarity. The tool units 5 may be provided with cuttings tools or bits 6 in the usual manner, by which workpieces which are mounted on the carrier 1 and advanced to different work-performing stations may be machined and/or engraved. The rotary workpiece carrier or dial 1 is provided with a plurality of workpiece holders 7, only one such holder being illustrated in Figure 1 and being shown therein in vertical section. The workpiece holder 7 may have a supporting head or nest at its upper extremity as shown, and may have a depending guide shank 7a which is vertically movable in a guide bushing 8 carried by the dial 1. The mounting of the workpiece holder 7 for upward advancing movement and downward retracting movement with respect to the tool bit 6 enables the latter to engage the workpieces for performing the desired machining operations thereon. It will be understood that the raising movement of the workpiece holder 7 for effecting the machining operation occurs during the period of rest of the workpiece carrier or dial 1. The indexing or advancing movements of the workpiece carrier 1, as well as the raising movements of the workpiece holders 7 are not the subject of the present invention, and accordingly the means by which such movements are effected are not shown herein for reasons of clarity of illustration.

In accordance with the present invention I provide on the rotary workpiece carrier 1 in conjunction with the holders 7 a plurality of stops or actuator members 9, one such member being provided for each workpiece holder and being located preferably radially inward from the latter. In Fig. 1 only one of the actuator members 9 is shown, whereas in Fig. 2 three such members are diagrammatically illustrated by broken outlines. The said members 9 are fixedly mounted on the workpiece carrier or dial 1, and as illustrated herein such members may be advantageously constituted as depending, tapered pins disposed parallel to the shaft 2 of the carrier. The pins 9 have their lower extremities rounded, as indicated as 9a.

Also, in accordance with the invention, each workpiece holder 7 is provided with a movable part the function of which is to engage and dislodge the workpiece from the holder. In the drawings this movable part is shown as a longitudinally shiftable ram or plunger 10 carried in a center bore 7b of the shank 7a of the workpiece holder. To prevent the rams of plungers 10 from falling out of the bores 7b they may be provided at their upper extremities with snap rings or disks 11, or other suitable means.

Also, in accordance with the present invention, I provide a novel actuator device on the machine frame or bed 4, said device being located at the discharge station of the machine. Such actuator device is adapted for engagement by the stop pins or actuator members 9, and also by the plungers 10 as the workpiece carrier 1 advances these parts to the discharge station of the machine. In the illustrated embodiment of the invention the actuator device is constituted as a two-armed lever 12 which is pivotally carried on a supporting post 13 extending upward from the machine bed. The lever 12 pivots about a pin 14 and is normally biased clockwise by means of a helical extension spring 15, as shown in Fig. 1. One arm 12a of the lever 12 functions to shift or raise the plunger 10 at the discharge station of the machine, whereas the other arm 12b of the lever is engageable with the stop pins or actuator members 9 at such station. The lever arm 12b is provided with a sliding or camming surface 12c which faces in a direction opposite to the direction of turning of the workpiece carrier 1, such direction of turning being indicated by the arrow 16 in Fig. 2. The camming surface 12c is disposed at an angle with respect to the plane of the workpiece carrier 1, as indicated. During the turning movements of the workpiece carrier 1 the actuator pins 9 will successively engage the camming surface 12c as such pins are brought to the discharge station of the machine. When this occurs, the lever 12 will be cammed in a counterclockwise direction, as viewed in Fig. 1. The arm 12a of the lever 12 is provided with an elongate lug or shoe 12d, see Fig. 2, which is disposed below the path of movement of the lower extremities of the plungers 10. In consequence of the counterclockwise turning or tilting of the lever 12 as effected by the actuator pins 9 at the discharge station of the machine, the shoe 12d will raise the plunger 10 of the associated workpiece holder, thereby ejecting the workpiece from the holder.

In Fig. 2 the workpiece carrier 1 is shown in one of its rest positions, wherein machining operations are performed on the workpieces and for such rest position the actuator device comprising the lever 12 is shown as disposed between two of the workpiece holders 7, the position of such actuator device indicating the discharge action of the machine.

The operation of the present improved machine tool is as follows:

As the workpiece carrier 1 is indexed or advanced in the direction of the arrow 16 and periodically halted in its different predetermined rotative positions the workpiece supports 7 and actuator pins 9 will be made to pass the actuator device comprising the two-armed lever 12. During the advancing or indexing movement of the carrier 1 the actuator pins 9 will engage the cam surface 12c of the lever, one after the other, and each pin will actuate the lever 12 in a counterclockwise direction as viewed in Fig. 1. When this occurs the associated plunger 10 will be engaged by the shoe 12 of the lever, and such plunger will be raised, thereby to disengage the workpiece from the workpiece holder 7. It will be understood that the biasing spring 15 tends to resist such counterclockwise tilting of the lever 12, and maintains the cam surface 12c in engagemment with the tips of the actuator pins 9 under a certain amount of pressure. Upon the plungers 10 being raised as the workpiece holders 7 move past the two-armed lever 12, the discs 11 carried by the top ends of the plungers will effect the discharge of the workpieces from the reception heads or nests at the tops of the workpiece holders. After discharge of the workpieces, well known means, as for example air pressure, may be utilized to completely remove the workpieces from the machine tool.

Upon completion of the discharge of the workpieces as described above, the workpiece carrier 1 comes to rest in another work-performing position. The workpiece holder 7 which has moved past the two-armed lever 12 and has had the workpiece discharged from it is now brought to rest at the next or succeeding work-performing station, and since it no longer carries the finished workpiece it is ready to receive a new workpiece which is to be machined. By such arrangement, wherein the discharge of the workpieces is effected during the advancing or indexing movements of the dial 1 an optimum number of work-performing stations and tool units may be provided around the dial, thereby utilizing to the fullest extent the possibilities of the present machine tool.

It will be understood from the foregoing description and from the drawings that the present improved machine tool is extremely simple in its construction as well as compact whereby the ejecting mechanism requires relatively little space. In spite of this, the operation of the workpiece-ejecting means is positive and extremely reliable at all times, being independent of the kinds and sizes of workpieces which are carried by the holders 7.

I claim:

1. A machine tool of the type capable of utilizing a plurality of tool units, comprising a base; a fully-turnable rotary workpiece carrier rotatably mounted on the base for turning about an axis; a plurality of workpiece holders mounted on said carrier, for supporting workpieces thereon in spaced relation about the axis thereof, said carrier being capable of indexing movement to dispose it in a number of different rotative positions corresponding to the number of workpiece holders carried thereby; a plurality of actuator members fixedly mounted on the workpiece carrier for concurrent movement therewith and equal in number to the number of workpiece holders, said actuator members being immovable with respect to the carrier for all rotative positions of the latter; workpiece-ejecting parts movably carried by the workpiece carrier to travel simultaneously therewith and associated with each of the workpiece holders for ejecting workpieces therefrom in response to actuation of the said parts; and means carried by the said base, engageable successively with the said parts and with the said actuator members in response solely to turning movement of the workpiece carrier as the latter is rotated, for actuating the parts to eject workpieces from the workpiece holders as a consequence of said turning movement.

2. The invention as defined in claim 1, in which the said means comprises a two-armed lever and a spring biasing the lever to a given position, one arm of said lever being engageable with the said workpiece-ejecting parts while the other arm of the lever is engageable with the said actuator members, said other arm having a sloping cam surface engaged by the actuator members and disposed at an angle with respect to the plane of the said workpiece carrier.

References Cited in the file of this patent

UNITED STATES PATENTS 1,611,363    O'Neill _____ Dec. 21, 1926